(12) United States Patent
Hirakata

(10) Patent No.: US 10,656,451 B2
(45) Date of Patent: *May 19, 2020

(54) LIQUID CRYSTAL CELL AND THREE-DIMENSIONAL LIQUID CRYSTAL CELL

(71) Applicant: FUJIFILM Corporation, Tokyo (JP)

(72) Inventor: Junichi Hirakata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 92 days.

This patent is subject to a terminal disclaimer.

(21) Appl. No.: 15/958,249

(22) Filed: Apr. 20, 2018

(65) Prior Publication Data

US 2018/0239187 A1 Aug. 23, 2018

Related U.S. Application Data

(63) Continuation of application No. PCT/JP2016/083552, filed on Nov. 11, 2016.

(30) Foreign Application Priority Data

Nov. 12, 2015 (JP) .................................. 2015-221778

(51) Int. Cl.
  *G02F 1/13* (2006.01)
  *G02F 1/1333* (2006.01)
  (Continued)

(52) U.S. Cl.
  CPC ........ *G02F 1/133365* (2013.01); *B32B 27/30* (2013.01); *C08F 120/28* (2013.01);
  (Continued)

(58) Field of Classification Search
  CPC ...................................................... G02F 1/133
  See application file for complete search history.

(56) References Cited

U.S. PATENT DOCUMENTS

| 4,629,637 A | 12/1986 | Waldenrath et al. |
| 2011/0052892 A1 | 3/2011 | Murakami |
| 2015/0210042 A1* | 7/2015 | Tapio .................. B32B 7/12 428/337 |

FOREIGN PATENT DOCUMENTS

| JP | 57-173816 A | 10/1982 |
| JP | 60-73616 A | 4/1985 |

(Continued)

OTHER PUBLICATIONS

International Preliminary Report on Patentability and Written Opinion of the International Searching Authority(Forms PCT/IB/326, PCT/IB/373 and PCT/ISA/237), dated May 24, 2018, for International Application No. PCT/JP2016/083552, with an English Translation of the Written Opinion.

(Continued)

*Primary Examiner* — Chanceity N Robinson
(74) *Attorney, Agent, or Firm* — Birch, Stewart, Kolasch & Birch, LLP

(57) ABSTRACT

The present invention is directed to a liquid crystal cell in which liquid crystal molecules are not blended into a plastic substrate even if the plastic substrate is deformed through stretching or shrinkage. A liquid crystal cell of the present invention includes at least two plastic substrates of which at least one is a heat-shrinkable film satisfying a heat shrinkage rate of 5% to 75%; a liquid crystal layer; and a polymer layer between at least one plastic substrate and the liquid crystal layer and into which a composition containing at least one monofunctional monomer having a hydrophilic group and is monofunctional acrylate or monofunctional methacrylate, and at least one polyfunctional monomer having two or more functional groups and is polyfunctional acrylate or polyfunctional methacrylate, is polymerized, in which a wavelength of maximum absorbance of each of the mono- (Continued)

functional monomer and the polyfunctional monomer is 190 to 250 nm.

20 Claims, 2 Drawing Sheets

(51) Int. Cl.
   *B32B 27/30*    (2006.01)
   *C08F 120/28*   (2006.01)
   *C08F 220/28*   (2006.01)
   *G02F 1/133*    (2006.01)
   *G02F 1/1334*   (2006.01)
   *G02F 1/1337*   (2006.01)
(52) U.S. Cl.
   CPC .......... *C08F 220/28* (2013.01); *G02F 1/1334* (2013.01); *G02F 1/13306* (2013.01); *G02F 1/133305* (2013.01); *G02F 1/133711* (2013.01); *G02F 2001/133357* (2013.01); *G02F 2201/50* (2013.01); *G02F 2201/503* (2013.01)

(56) References Cited

FOREIGN PATENT DOCUMENTS

| | | |
|---|---|---|
| JP | 60-244537 A | 12/1985 |
| JP | 11-314303 A | 11/1999 |
| JP | 2001-150584 A | 6/2001 |
| JP | 2011-51220 A | 3/2011 |
| KR | 20030059039 A * | 7/2003 |

OTHER PUBLICATIONS

International Search Report (Form PCT/ISA/210) dated Jan. 17, 2017, for International Application No. PCT/JP2016/083552 with an English Translation.

* cited by examiner

LIQUID CRYSTAL CELL AND THREE-DIMENSIONAL LIQUID CRYSTAL CELL

CROSS-REFERENCE TO RELATED APPLICATIONS

This application is a Continuation of PCT International Application No. PCT/JP2016/083552 filed on Nov. 11, 2016, which claims priority under 35 U.S.C. § 119(a) to Japanese Patent Application No. 2015-221778 filed on Nov. 12, 2015. The above application is hereby expressly incorporated by reference, in its entirety, into the present application.

BACKGROUND OF THE INVENTION

1. Field of the Invention

The present invention relates to a liquid crystal cell using a plastic substrate, and a three-dimensional liquid crystal cell using the liquid crystal cell.

2. Description of the Related Art

Recently, various plastic substrates have been examined as a replacement for a glass substrate of a device such as a liquid crystal display device.

In addition, it has been known that gas barrier properties for shielding oxygen and moisture are inferior in the plastic substrate compared to those of the glass substrate, and thus a gas barrier layer is used in combination for sealing.

As such a gas barrier layer, a gas barrier film having an organic layer and an inorganic layer has been examined (for example, JP2011-51220A).

SUMMARY OF THE INVENTION

In a case of using the plastic substrate, a liquid crystal cell can be used for a flexible display and the like which is attracting attention recently, but a required degree of flexibility for a liquid crystal cell becomes much higher. Accordingly, there is a problem in that in a case of forming a curved surface in larger curvature by stretching, shrinkage, bending, or the like, liquid crystal molecules are blended into the plastic substrate, white turbidity is generated, and therefore display performance deteriorates.

In addition, it has been found that the gas barrier layer has a certain effect of preventing the liquid crystal molecules from blending into the plastic substrate, but because a laminate is formed of an organic layer and an inorganic layer, the inorganic layer cannot follow stretching or shrinkage in a case of forming a curved surface, and therefore cracks occur as a result.

An object of the present invention is to provide a liquid crystal cell which can suppress blending of liquid crystal molecules into a plastic substrate even in a case where the plastic substrate is greatly deformed through stretching or shrinkage, and a three-dimensional liquid crystal cell using the liquid crystal cell.

The inventors of the present invention have conducted intensive studies, and as a result, have found that in a liquid crystal cell, by providing a specific polymer layer between a plastic substrate and a liquid crystal layer, liquid crystal molecules are not blended into the plastic substrate, and therefore display performance as a liquid crystal cell can be prevented from deteriorating even in a case where the plastic substrate is greatly deformed.

That is, it has been found that the above-described object can be achieved with the following configuration.

[1] A liquid crystal cell, comprising: at least two plastic substrates of which at least one plastic substrate is a heat-shrinkable film satisfying a heat shrinkage rate of 5% to 75%; a liquid crystal layer; and a polymer layer that is disposed between at least one plastic substrate and the liquid crystal layer and into which a composition containing at least one monofunctional monomer that has a hydrophilic group and is selected from the group consisting of monofunctional acrylate and monofunctional methacrylate, and at least one polyfunctional monomer that has two or more functional groups and is selected from the group consisting of polyfunctional acrylate and polyfunctional methacrylate, is polymerized, in which a wavelength of maximum absorbance of each of the monofunctional monomer and the polyfunctional monomer is 190 to 250 nm.

[2] The liquid crystal cell according to [1], in which the composition containing the monofunctional monomer and the polyfunctional monomer exhibits any one or both of thermosetting properties and ultraviolet curing properties.

[3] The liquid crystal cell according to [1] or [2], in which the monofunctional monomer has two or more hydrophilic groups.

[4] The liquid crystal cell according to any one of [1] to [3], in which the hydrophilic group is a nonionic hydrophilic group.

[5] The liquid crystal cell according to [4], in which the nonionic hydrophilic group is at least one hydrophilic group selected from the group consisting of a hydroxyl group, a substituted or unsubstituted amino group, and a polyethylene glycol group.

[6] The liquid crystal cell according to any one of [1] to [5], in which the monofunctional monomer has two or more hydroxyl groups as the hydrophilic group.

[7] The liquid crystal cell according to any one of [1] to [5], in which the monofunctional monomer has both a hydroxyl group and a substituted or unsubstituted amino group as the hydrophilic group.

[8] The liquid crystal cell according to any one of [1] to [7], in which a SP value of the monofunctional monomer is 22 to 40.

[9] The liquid crystal cell according to any one of [1] to [8], in which all the plastic substrates are heat-shrinkable films satisfying a heat shrinkage rate of 5% to 75%.

[10] The liquid crystal cell according to any one of [1] to [9], in which at least one plastic substrate is a thermoplastic resin film stretched at a ratio that is greater than 0% and not greater than 300%.

[11] The liquid crystal cell according to any one of [1] to [10], further comprising: a conductive layer that is disposed between the plastic substrate and the polymer layer.

[12] The liquid crystal cell according to [11], in which the conductive layer is formed of at least one compound selected from the group consisting of metal nanowire, carbon nanotube, graphene, polymer conductor, and metal mesh.

[13] The liquid crystal cell according to [11] or [12], in which any one or both of the conductive layer and the polymer layer have a migration inhibitor.

[14] The liquid crystal cell according to any one of [1] to [10], further comprising: a conductive layer that is disposed between the polymer layer and the liquid crystal layer.

[15] A three-dimensional liquid crystal cell which is formed by dimensionally changing the liquid crystal cell according to any one of [1] to [14] at a rate of ±5% to 75%.

According to the present invention, it is possible to provide a liquid crystal cell in which liquid crystal molecules are not blended into a plastic substrate even in a case where the plastic substrate is greatly deformed through stretching or shrinkage, and a three-dimensional liquid crystal cell using the liquid crystal cell.

DESCRIPTION OF THE PREFERRED EMBODIMENTS

Hereinafter, the invention will be described in detail.

The following description of constituent requirements is based on typical embodiments of the invention, but the invention is not limited thereto.

In this specification, a numerical value range expressed using "to" means a range including numerical values before and after "to" as a lower limit value and an upper limit value.

In the present specification, parallel or perpendicular does not mean parallel or perpendicular in a strict sense but means a range of having ±5° from parallel or perpendicular.

In the present invention, "(meth)acrylate" represents to any one of or both acrylate and methacrylate, "(meth)acryl" represents to any one of or both acryl and methacryl, and "(meth)acryloyl" represents to any one of or both acryloyl and methacryloyl.

A monomer in the present specification is distinguished from an oligomer and a polymer and is a compound having a weight-average molecular weight of 2,000 or less.

In the present invention, a polymerizable compound is a compound having a polymerizable functional group and may be a monomer or a polymer. The polymerizable functional group refers to a group involved in polymerization reaction.

<Liquid Crystal Cell>

A liquid crystal cell of the present invention includes at least two plastic substrates of which at least one plastic substrate is a heat-shrinkable film satisfying a heat shrinkage rate of 5% to 75%; a liquid crystal layer; and a polymer layer that is disposed between at least one plastic substrate and the liquid crystal layer and into which a composition containing at least one monofunctional monomer (hereinafter will be referred to as "monofunctional (meth)acrylate") that has a hydrophilic group and is selected from the group consisting of monofunctional acrylate and monofunctional methacrylate, and at least one polyfunctional monomer (hereinafter will be referred to as "polyfunctional (meth)acrylate") that has two or more functional groups and is selected from the group consisting of polyfunctional acrylate and polyfunctional methacrylate, is polymerized.

In addition, in the liquid crystal cell of the present invention, at least one plastic substrate is a heat-shrinkable film satisfying a heat shrinkage rate of 5% to 75%.

Furthermore, in the liquid crystal cell of the present invention, a wavelength of maximum absorbance of each of the monofunctional (meth)acrylate and the polyfunctional (meth)acrylate which have a hydrophilic group is 190 to 250 nm.

Figure 1:
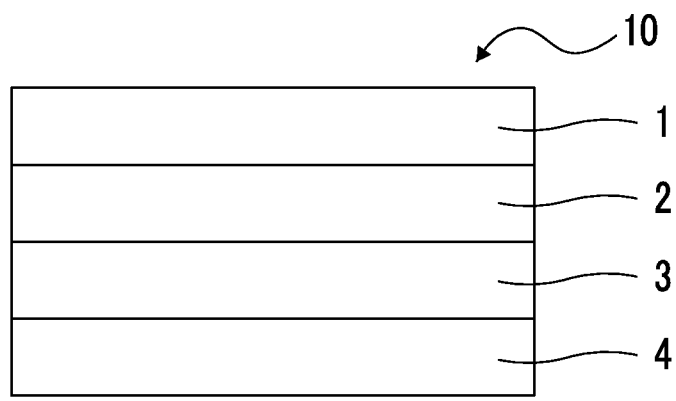
FIG. 1 is a cross sectional view schematically illustrating an aspect of a liquid crystal cell of the present invention.

FIG. 1 is a cross sectional view schematically illustrating an example of the liquid crystal cell of the present invention.

A liquid crystal cell 10 shown in FIG. 1 includes two plastic substrates 1 and 4, a liquid crystal layer 3, and a polymer layer 2 that is disposed between the plastic substrate 1 and the liquid crystal layer 3 and into which a composition containing monofunctional (meth)acrylate and polyfunctional (meth)acrylate which have a hydrophilic group, is polymerized.

In addition, in the liquid crystal cell 10 shown in FIG. 1, at least one plastic substrate is a heat-shrinkable film satisfying a heat shrinkage rate of 5% to 75%, and a wavelength of maximum absorbance of each of the monofunctional (meth)acrylate and the polyfunctional (meth)acrylate which have a hydrophilic group is 190 to 250 nm.

Figure 2A:
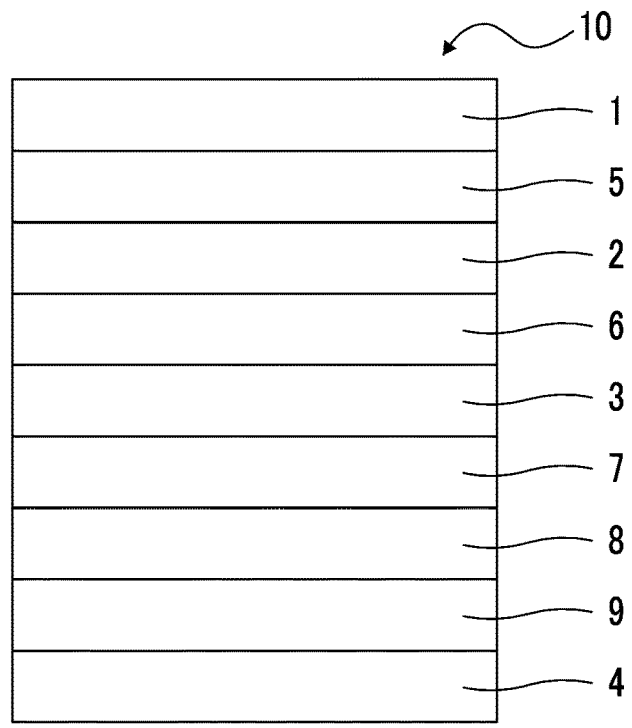
FIG. 2A is a cross sectional view schematically illustrating another aspect of the liquid crystal cell of the present invention.
Figure 2B:
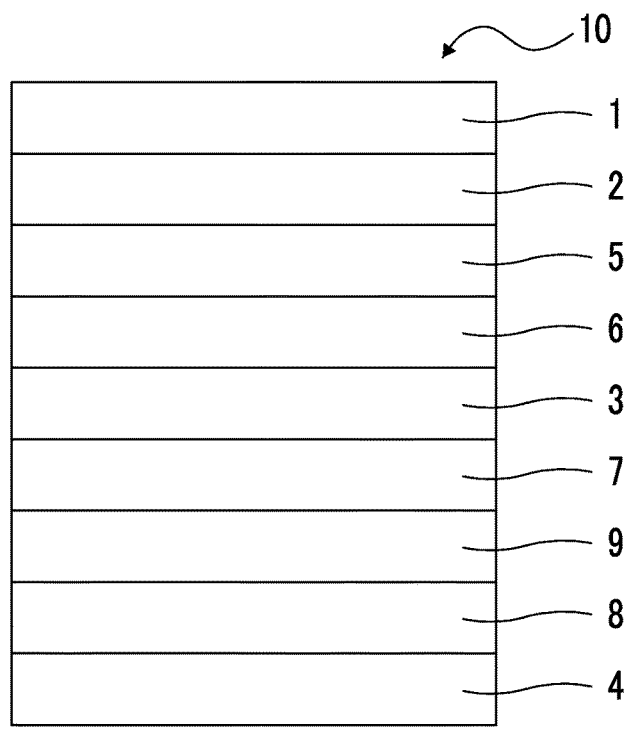
FIG. 2B is a cross sectional view schematically illustrating still another aspect of the liquid crystal cell of the present invention.

FIG. 2A and FIG. 2B are examples of cross sectional views schematically illustrating particularly preferable liquid crystal cell of the present invention.

A liquid crystal cell 10 shown in FIG. 2A includes two plastic substrates 1 and 4, a liquid crystal layer 3, a polymer layer 2 that is disposed between the plastic substrate 1 and the liquid crystal layer 3 and into which a composition containing monofunctional (meth)acrylate and polyfunctional (meth)acrylate which have a hydrophilic group, is polymerized, and a polymer layer 8 that is disposed between the plastic substrate 4 and the liquid crystal layer 3 and into which a composition containing monofunctional (meth) acrylate and polyfunctional (meth)acrylate which have a hydrophilic group, is polymerized. The liquid crystal cell 10 shown in FIG. 2A further includes an alignment film 6 between the polymer layer 2 and the liquid crystal layer 3 and an alignment film 7 between the polymer layer 8 and the liquid crystal layer 3, and further includes a conductive layer 5 between the plastic substrate 1 the polymer layer 2 and a conductive layer 9 between the plastic substrate 4 and the polymer layer 8.

FIG. 2B shows the liquid crystal cell having an aspect in which in the liquid crystal cell 10 shown in FIG. 2A, a laminate position of the polymer layer 2 and the conductive layer 5 are reversed and a laminate position of the polymer layer 8 and the conductive layer 9 are reversed.

In the liquid crystal cell 10 shown in FIG. 2A and FIG. 2B, at least one plastic substrate is a heat-shrinkable film satisfying a heat shrinkage rate of 5% to 75%, and a wavelength of maximum absorbance of each of the monofunctional (meth)acrylate and the polyfunctional (meth) acrylate which have a hydrophilic group is 190 to 250 nm.

In the present invention, in a case where a conductive layer to be described below is formed of metal nanowire and/or metal mesh, an aspect in which a conductive layer and/or a polymer layer has a migration inhibitor is particularly preferable.

In regard to a spacer for controlling a cell gap of the liquid crystal layer, a photospacer or a spherical spacer may be separately arranged on the alignment film, the polymer layer, and the conductive layer, or a spherical spacer is added to the alignment film or the polymer layer in advance to collectively form the alignment film and the polymer layer.

In the liquid crystal cell of the present invention, for the purpose of being used in a dimming element, dye molecules and the like which are used for changing the strength and weakness of light of the liquid crystal layer may be used in combination.

In the present invention, the liquid crystal cell includes a liquid crystal cell used in a liquid crystal display device that is used in a flat screen TV, a monitor, a laptop computer, a mobile phone, and the like, and includes a liquid crystal cell used in a dimming device for changing the strength and weakness of light, which is applied to interior, a building material, a vehicle, and the like. That is, the liquid crystal cell is a generic term of a device in which a liquid crystal material sealed between two substrates, and the like are driven.

In the present specification, terms of a liquid crystal cell before three-dimensional formation and a three-dimensional liquid crystal cell after three-dimensional formation are distinguishably used in some cases.

In addition, the liquid crystal cell of the present invention, that is, the liquid crystal cell including a heat-shrinkable film satisfying a heat shrinkage rate of 5% to 75% as at least one plastic substrate means a liquid crystal cell for formation before heat shrinkage.

Regarding drive modes of the liquid crystal cell, various methods can be used including a horizontal alignment mode (In-Plane-Switching: IPS), a vertical alignment mode (Vertical Alignment: VA), a twisted nematic mode (Twisted Nematic: TN), and a super twisted nematic mode (Super Twisted Nematic: STN).

Depending on the configuration of the liquid crystal cell, on the outside of the liquid crystal cell, a backlight member, a polarizing plate member, or the like may be provided or may be attached to the configuration.

[Liquid Crystal Layer]

The liquid crystal layer used in the present invention is not particularly limited as long as it is a continuous body with fluidity. A material state thereof is particularly preferably a rod-like liquid crystal body, and it is most preferable that a rod-like liquid crystal composition is used as a liquid crystal to form a liquid crystal cell.

[Polymer Layer]

The polymer layer used in the present invention is a layer into which a composition containing monofunctional (meth)acrylate that has a hydrophilic group and polyfunctional acrylate that has two or more functional groups, is polymerized.

The polymer layer used in the present invention may be a copolymer formed of monofunctional (meth)acrylate having a hydrophilic group and polyfunctional (meth)acrylate having two or more functional groups or may be formed of other repeating units and a copolymer. In a case where the layer is formed of the copolymer, the other repeating unit may be a repeating unit not having a hydrophilic group. Examples of the other repeating unit include a unit in which a vinyl group, a styryl group, an allyl group, and the like are copolymerized.

An amount of the monofunctional (meth)acrylate monomer having a hydrophilic group in the polymer layer used in the present invention is preferably 30% to 99.9% by mass, particularly preferably 50% to 90% by mass, and most preferably 70% to 85% by mass with respect to the total amount of the constituent monomer in the polymer layer.

An amount of the polyfunctional (meth)acrylate monomer having two or more functional groups in the polymer layer used in the present invention is preferably 5% to 90% by mass, particularly preferably 10% to 66% by mass, and most preferably 15% to 30% by mass with respect to the total amount of the constituent monomer in the polymer layer.

A mass average molecular weight of the polymer in the polymer layer used in the present invention is preferably 1,000,000 or less, particularly preferably 500,000 or less, and most preferably 50,000 to 300,000.

A mass average molecular weight can be measured as a value in terms of polystyrene (PS) by using gel permeation chromatography (GPC).

By using the polymer layer used in the present invention, it is possible to provide the liquid crystal cell in which liquid crystal molecules are not blended into the plastic substrate even in a case where the plastic substrate is greatly deformed through heat stretching or heat shrinkage performed by heating.

The polymer layer also functions as an index matching layer of the conductive layer, and wires such as metal mesh can be shielded thereby. In addition, by lowering permeability of water or oxygen, migration of metal nanowire and the like can be improved, and by adding conductive fine particles to the polymer layer, surface electrical resistance can be decreased. Furthermore, by allowing the plastic substrate to be impregnated with the constituent monomer in the polymer layer, adhesiveness of the plastic substrate, the conductive layer, and the polymer layer can be improved.

{Monofunctional (Meth)Acrylate Having Hydrophilic Group}

The monofunctional (meth)acrylate having a hydrophilic group which is used in the present invention has at least one hydrophilic group. In addition, the monofunctional (meth)acrylate preferably has two or more hydrophilic groups.

The hydrophilic group used in the present invention is preferably a nonionic hydrophilic group so as not to hinder drive performance of the liquid crystal cell.

As the nonionic hydrophilic group, at least one hydrophilic group selected from the group consisting of a hydroxyl group, a substituted or unsubstituted amino group, and a polyethylene glycol group is particularly preferable, and a hydroxyl group or a polyethylene glycol group is most preferable.

In a case where the monofunctional (meth)acrylate having the hydrophilic group used in the present invention has two or more hydrophilic groups, an aspect in which all hydrophilic groups are hydroxyl groups, or an aspect in which both hydroxyl group and substituted or unsubstituted amino group are contained, is preferable.

Specific examples of the monofunctional (meth)acrylate having the hydrophilic group which is used in the present invention include (meth)acrylate esters of polyoxyalkylene glycol, (meth)acrylate esters of polyhydric alcohols, (meth)acrylate esters of ethylene oxide or propylene oxide adduct, epoxy (meth)acrylates, urethane (meth)acrylates, polyester (meth)acrylates, (meth)acrylamides, (meth)acryloyl morpholines, and the like.

As the monofunctional (meth)acrylate having the hydrophilic group which is used in the present invention, commercially available monofunctional (meth)acrylate can also be used. For example, as (meth)acrylate esters of polyhydric alcohols, BLEMMER GLM manufactured by NOF CORPORATION and the like can be used, and as (meth)acrylate esters of polyoxyalkylene glycol, BLEMMER AE400, and the like can be used.

The monofunctional (meth)acrylate having the hydrophilic group which is used in the present invention has a wavelength of maximum absorbance of 190 to 250 nm and preferably has a wavelength of maximum absorbance of 190 to 230 nm from the viewpoint of light transmittance of the polymer layer into which the composition containing the monofunctional (meth)acrylate is polymerized, and the whole liquid crystal cell.

{Polyfunctional (Meth)Acrylate}

The polyfunctional (meth)acrylate monomer used in the present invention is a monomer having two or more (meth) acrylate groups in the molecules. Specific examples thereof include a polyfunctional monomer having acrylate and methacrylate functional groups. The number of double bond in the molecules is preferably 2 to 20, still more preferably 2 to 15, and most preferably 2 to 6.

The polyfunctional (meth)acrylate is particularly preferably soluble in an organic solvent.

Examples of such a monomer include a compound having a boiling point of 100 degrees or higher at normal pressure, preferably 150 to 400 degrees.

Among the polyfunctional (meth)acrylates, examples of bifunctional (meth)acrylate include ethylene glycol di(meth) acrylate, 1,6-hexanediol di(meth)acrylate, 1,9-nonanediol di(meth)acrylate, polypropylene glycol di(meth)acrylate, tetraethylene glycol di(meth)acrylate, bisphenoxyethanol fluorene diacrylate, and the like. Examples of a commercially available product thereof include ARONIX series M-210, M-240, and M-6200 (manufactured by TOAGOSEI CO., LTD.), KAYARAD series HDDA, HX-220, and R-604 (manufactured by Nippon Kayaku Co., Ltd.), VISCOAT series 260, 312, and 335HP (manufactured by OSAKA ORGANIC CHEMICAL INDUSTRY LTD.) (all of which are trade names), and the like.

Examples of trifunctional (meth)acrylate include trimethylolpropane tri(meth)acrylate, pentaerythritol tri(meth)acrylate, tri((meth)acryloyloxyethyl) phosphate, pentaerythritol tetra(meth)acrylate, dipentaerythritol penta(meth)acrylate, dipentaerythritol hexa(meth)acrylate, and the like. Examples of a commercially available product thereof include ARONIX series M-309, M-400, M-405, M-450, M-7100, M-8030, and M-8060 (manufactured by TOAGOSEI CO., LTD.), KAYARAD series TMPTA, DPHA, DPCA-20, DPCA-30, DPCA-60, and DPCA-120 (manufactured by Nippon Kayaku Co., Ltd.), VISCOAT series 295, 300, 360, GPT, 3PA, and 400 (manufactured by OSAKA ORGANIC CHEMICAL INDUSTRY LTD.) (all of which are trade names), and the like.

Other examples of bifunctional or trifunctional or higher functional (meth)acrylate include polyethylene glycol di(meth)acrylate, polypropylene glycol di(meth)acrylate, trimethylol ethane triacrylate, trimethylolpropane diacrylate, neopentyl glycol di(meth)acrylate, dipentaerythritol penta(meth)acrylate, hexanediol di(meth)acrylate, trimethylolpropane tri(acryloyloxypropyl) ether, tri(acryloyloxyethyl) isocyanurate, tri(acryloyloxyethyl) cyanurate, glycerin tri(meth)acrylate, tri((meth)acryloyloxyethyl) phosphate, dipentaerythritol penta(meth)acrylate, dipentaerythritol hexa(meth)acrylate; polyfunctional acrylates or polyfunctional methacrylates such as (meth)acrylated products obtained by adding ethylene oxide or propylene oxide to polyfunctional alcohols such as trimethylolpropane and glycerin; poly(meth)acrylate of polyether polyol; poly (meth)acrylate of polyester polyol; poly(meth)acrylate of polyurethane polyol; and the like.

The polyfunctional (meth)acrylate used in the present invention has a wavelength of maximum absorbance of 190 to 250 nm and preferably has a wavelength of maximum absorbance of 190 to 230 nm from the viewpoint of light transmittance of the polymer layer into which the composition containing polyfunctional (meth)acrylate is polymerized, and the whole liquid crystal cell.

In the present invention, the composition containing the monofunctional (meth)acrylate having the hydrophilic group and the polyfunctional acrylate is preferably a composition exhibiting any one or both of thermosetting properties and ultraviolet curing properties. Specifically, the composition is preferably a composition containing a polymerization initiator to be described below and the like.

{Polymerization Initiator}

The polymer layer used in the present invention preferably contains a polymerization initiator in the composition forming the polymer layer.

As the polymerization initiator, known polymerization initiator can be suitability used according to light polymerization or thermal polymerization.

Examples of the photopolymerization initiator include an α-carbonyl compound (disclosed in each specification of U.S. Pat. No. 2,367,661A and U.S. Pat. No. 2,367,670A), acyloin ether (disclosed in the specification of U.S. Pat. No. 2,448,828A), an α-hydrocarbon-substituted aromatic acyloin compound (disclosed in the specification of U.S. Pat. No. 2,722,512A), a polynuclear quinone compound (disclosed in each specification of U.S. Pat. No. 3,046,127A and U.S. Pat. No. 2,951,758A), combination of triarylimidazole dimer and p-aminophenyl ketone (disclosed in the specification of U.S. Pat. No. 3,549,367A), acridine and phenazine compounds (disclosed in each specification of JP1985-105667A (JP-S60-105667A) and U.S. Pat. No. 4,239,850A), an oxadiazole compound (disclosed in the specification of U.S. Pat. No. 4,212,970A), and the like.

An amount of the photopolymerization initiator used is preferably 0.01% to 20% by mass and still more preferably 1% to 10% by mass with respect to a solid content of the composition forming the polymer layer.

In regard to an example of the photopolymerization initiator, an amount of the photopolymerization initiator used, and a value of light irradiation energy for polymerization, those disclosed in paragraphs [0050] to [0051] of JP2001-91741A can also be adopted to the present invention.

The monofunctional (meth)acrylate having the hydrophilic group and the polyfunctional (meth)acrylate having two or more functional groups which are used in the present invention have a wavelength of maximum absorbance of 190 to 250 nm and preferably have a wavelength of maximum absorbance of 190 to 230 nm from the viewpoint of light transmittance of the polymer layer into which the composition containing monofunctional (meth)acrylate and polyfunctional (meth)acrylate is polymerized, and the whole liquid crystal cell.

{Solvent}

The polymer layer used in the present invention is formed by using a coating solution of the composition of monofunctional and polyfunctional (meth)acrylates. As a solvent used in preparation of the coating solution, an organic solvent is preferable.

The organic solvent is not particularly limited as long as the organic solvent does not significantly damage the plastic substrate. Alcohols (such as methanol, ethanol, and polyethylene glycol monomethyl ether), amides (such as N,N-dimethylformamide), sulfoxides (such as dimethyl sulfoxide), a heterocyclic compound (such as pyridine), hydrocarbons (such as benzene and hexane), alkyl halides (such as chloroform and dichloromethane), esters (such as methyl acetate and butyl acetate), ketones (such as acetone and methyl ethyl ketone), and ethers (such as tetrahydrofuran and 1,2-dimethoxyethane) are preferable, and alcohols, esters, and ethers are still more preferable. Using two or more organic solvents in combination is particularly preferable. In a case where a small amount of a solvent having good affinity for the plastic substrate is used in combination, the plastic substrate can be impregnated with the monofunctional and polyfunctional (meth)acrylates, and therefore adhesiveness can be improved.

«Wavelength of Maximum Absorbance»

A transmission spectrum within a range of 190 to 700 nm is measured under an atmosphere of 25° C. and relative humidity of 55% by using a spectrophotometer (UV 3150 manufactured by Shimadzu Corporation), and a wavelength of maximum absorbance in the present invention is a wavelength at which the intensity of light becomes a minimum.

A SP value of the monofunctional (meth)acrylate having the hydrophilic group used in the present invention is more preferably 22 to 40 and still more preferably 24 to 28.

«SP Value»

A SP value (solubility parameter) of the present invention is a numerical value defined by the square root of the cohesive energy density and represents intermolecular force. The SP value is one display method that can quantitatively determine the polarity of a low molecular weight compound such as a polymer or a solvent and can be obtained by the calculation shown below or by actual measurement.

$$SP \text{ value } (\delta) = (\Delta Ev/V)^{1/2}$$

In Expression, $\Delta Ev$ represents the molar evaporation energy, and V represents the molar volume.

In the present invention, SP values all calculated by Hoy's method were used.

{Method for Forming Polymer Layer}

The polymer layer used in the present invention can be formed by directly applying, to the plastic substrate, the composition containing the monofunctional (meth)acrylate having the hydrophilic group and polyfunctional (meth) acrylate, or applying the composition via other layers, and then performing drying, hardening, and the like. A forming aspect in which the polymer layer is directly or indirectly disposed on a conductive layer to be described later, and an alignment film is directly or indirectly disposed on the polymer layer, is particularly preferable. In addition, the composition is applied to other support, and drying, hardening, and the like are performed to form a layer, and then the layer is peeled off so as to be laminated to the plastic substrate by using a pressure sensitive adhesive and the like, and therefore the polymer layer can be formed.

[Plastic Substrate]

The liquid crystal cell of the present invention is formed not by the glass substrate in the related art but by the plastic substrate in order to realize three-dimensional formability with a high degree of freedom.

In a case of three-dimensionally forming the liquid crystal cell, dimensional changes such as stretching and shrinkage locally generated, and therefore a thermoplastic resin is preferably used as the plastic substrate. As the thermoplastic resin, a polymer resin having excellent optical transparency, mechanical strength, heat stability, and the like is preferable.

Examples of a polymer contained in the plastic substrate include a polycarbonate-based polymer; a polyester-based polymer such as polyethylene terephthalate (PET); an acrylic-based polymer such as polymethyl methacrylate (PMMA); a styrene-based polymer such as polystyrene, and a styrene-acrylonitrile copolymer (AS resin); and the like.

Examples thereof further include a polyolefin such as polyethylene and polypropylene; a polyolefin-based polymer such as a norbornene-based resin and an ethylene-propylene copolymer; an amide-based polymer such as a vinyl chloride-based polymer, nylon, and an aromatic polyamide; an imide-based polymer; a sulfone-based polymer; a polyethersulfone-based polymer; a polyether ether ketone-based polymer; a polyphenylene sulfide-based polymer; a vinylidene chloride-based polymer; a vinyl alcohol-based polymer; a vinyl butyl-based polymer; an arylate-based polymer; a polyoxymethylene-based polymer; an epoxy-based polymer; a cellulose-based polymer represented by triacetylcellulose; a copolymer copolymerized with monomer units of these polymers; and the like.

Examples of the plastic substrate also include a substrate formed by mixing two or more kinds of the polymers mentioned above as examples.

{Heat-Shrinkable Film}

In a case of producing a three-dimensional liquid crystal cell to be described below, at least one of at least two plastic substrates is preferably a heat-shrinkable film, and it is more preferable that all the plastic substrates are the heat-shrinkable film in a case where the three-dimensional liquid crystal cell is formed by using shrinkage of the liquid crystal cell.

The shrinkage of this heat-shrinkable film enables the realization of three-dimensional formability with a high degree of freedom.

Means for shrinkage is not particularly limited, and examples thereof include shrinkage by stretching during the process of film formation. The effect caused by shrinkage of the film itself, shrinkage by residual distortion during film formation, shrinkage by a residual solvent, or the like can also be used.

«Heat Shrinkage Rate»

The heat shrinkage rate of the heat-shrinkable film used in the invention is 5% to 75%, preferably 7% to 60%, and more preferably 10% to 45%.

In the heat-shrinkable film used in the invention, the maximum heat shrinkage rate in an in-plane direction of the heat-shrinkable film is preferably 5% to 75%, more preferably 7% to 60%, and even more preferably 10% to 45%. In a case where stretching is performed as means for shrinkage, the in-plane direction in which the maximum heat shrinkage rate is shown substantially coincides with a stretching direction.

In the heat-shrinkable film used in the invention, the heat shrinkage rate in a direction perpendicular to the in-plane direction in which the maximum heat shrinkage rate is shown is preferably 0% to 5%, and more preferably 0% to 3%.

A measurement sample is cut every 5° in the measurement of a heat shrinkage rate under conditions to be described later, heat shrinkage rates in an in-plane direction of all of the measurement samples are measured, and the in-plane direction in which the maximum heat shrinkage rate is shown is specified by a direction in which the maximum measurement value is shown.

In the invention, the heat shrinkage rate is a value measured under the following conditions.

To measure the heat shrinkage rate, a measurement sample having a length of 15 cm and a width of 3 cm with a long side in a measurement direction was cut, and 1 cm-squares were stamped on one film surface in order to measure the film length. A point separated from an upper part of a long side of 15 cm by 3 cm on a central line having a width of 3 cm was set as A, a point separated from a lower part of the long side by 2 cm was set as B, and a distance AB of 10 cm between the points was defined as an initial film length $L_0$. The film was clipped up to 1 cm away from the upper part of the long side with a clip having a width of 5 cm and hung from the ceiling of an oven heated to a glass transition temperature (Tg) of the film. In this case, the film was put into a tension-free state while not being weighted. The entire film was sufficiently and uniformly heated, and after 5 minutes, the film was taken out of the oven for each clip to measure a length L between the points A and B after the heat shrinkage, and a heat shrinkage rate was obtained through Expression 2.

$$\text{Heat Shrinkage Rate (\%)} = 100 \times (L_0 - L)/L_0 \quad \text{(Expression 2)}$$

«Glass Transition Temperature (Tg)»

The Tg of the heat-shrinkable film used in the invention can be measured using a differential scanning calorimeter.

Specifically, the measurement was performed using a differential scanning calorimeter DSC7000X manufactured by Hitachi High-Tech Science Corporation under conditions of a nitrogen atmosphere and a rate of temperature increase of 20° C./min, and a temperature at a point where tangents of respective DSC curves at a peak top temperature of a time differential DSC curve (DDSC curve) of the obtained result and at a temperature of (peak top temperature—20° C.) intersected was set as a Tg.

{Stretching Step}

The heat-shrinkable film used in the invention may be an unstretched thermoplastic resin film, but preferably a stretched thermoplastic resin film.

The stretching ratio is not particularly limited, but preferably greater than 0% and not greater than 300%. The stretching ratio is more preferably greater than 0% and not greater than 200%, and even more preferably greater than 0% and not greater than 100% from the practical stretching step.

The stretching may be performed in a film transport direction (longitudinal direction), in a direction perpendicular to the film transport direction (transverse direction), or in both of the directions.

The stretching temperature is preferably around the glass transition temperature Tg of the heat-shrinkable film to be used, more preferably Tg±0° C. to 50° C., even more preferably Tg±0° C. to 40° C., and particularly preferably Tg±0° C. to 30° C.

In the invention, the film may be biaxially stretched simultaneously or sequentially in the stretching step. In a case of sequential biaxial stretching, the stretching temperature may be changed for each stretching in each direction.

In a case of sequential biaxial stretching, it is preferable that first, the film is stretched in a direction parallel to the film transport direction, and then stretched in a direction perpendicular to the film transport direction. The stretching temperature range in which the sequential stretching is performed is more preferably the same as a stretching temperature range in which the simultaneous biaxial stretching is performed.

[Conductive Layer]

Any conductive layer used in the present invention is a layer which is conductive and arranged between the plastic substrate and the polymer layer or between the polymer layer and the liquid crystal layer.

In the present invention, the phase "is conductive" means that a sheet resistance value is 0.1Ω/□ to 10,000Ω/□ and includes a layer generally called an electrical resistivity layer.

In a case where the conductive layer is used as an electrode of a flexible display device and the like, a sheet resistance value is preferably low, and specifically, is preferably 300Ω/□ or lower, particularly preferably 200Ω/□ or lower, and most preferably 100Ω/□ or lower.

Any conductive layer used in the present invention is preferably transparent. In the present invention, the term "transparent" means that light transmittance is 60% to 99%.

The light transmittance of the conductive layer is preferably 75% or higher, particularly preferably 80% or higher, and most preferably 90% or higher.

A heat shrinkage rate of any conductive layer used in the present invention is preferably close to a heat shrinkage rate of the substrate. By using such a conductive layer, it is possible that a short circuit in the conductive layer is unlikely to occur and a change in electric resistivity is suppressed to be small, the short circuit and the change occurring in associated with the shrinkage of the substrate.

Specifically, a heat shrinkage rate of the conductive layer is preferably 50% to 150%, is more preferably 80% to 120%, and still more preferably 90% to 110% with respect to a heat shrinkage rate of the substrate.

Examples of a material that can be used for any conductive layer used in the present invention include metal oxide (such as Indium Tin Oxide (ITO)); Carbon Nanotube (CNT), Carbon Nanobud (CNB), and the like; graphene; polymer conductors (such as polyacetylene, polypyrrole, polyphenol, polyaniline, and PEDOT/PSS); metal nanowires (such as silver nanowires and copper nanowires); metal mesh (such as silver mesh and copper mesh); and the like. It is preferable that the conductive layer of the metal mesh is formed by dispersing conductive fine particles such as silver and copper in a matrix, rather than formed of only a metal, from the viewpoint of a heat shrinkage rate.

The metal oxide such as ITO is a ceramic material and in a case of molding without shrinkage as in the related art, there is a problem in that a crack is easily formed by stretching action and therefore sheet resistance value significantly increases. On the other hand, utilizing the shrinkage in the present invention suppresses the occurrence of a crack, by which the problem of the related art that the sheet resistance value becomes high is improved, and therefore the metal oxide can be used for the conductive layer.

It is possible that the conductive layer having the metal mesh form or the carbon nanotube form, or in which particles such as metal nanowire are dispersed in a matrix, is easily associated with the shrinkage of the substrate by setting a shrinkage temperature of the substrate to become equal to or less than a glass transition temperature (Tg) of the matrix. This conductive layer is preferable in that occurrence of wrinkles can be suppressed and an increase of haze can be suppressed, compared to the conductive layer using the metal oxide or a polymer conductor.

[Alignment Film]

Any alignment film used in the present invention is not particularly limited, and an alignment film using a compound by which a vertical alignment of a rod-like liquid crystal can be achieved is preferable. As a particularly preferable alignment film, the alignment film preferably contains at least one compound selected from the group consisting of soluble polyimide, polyamic acid, polyamic acid ester, methacrylic acid copolymer, alkyl group-containing alkoxysilane, alkyl group-containing ammonium, and pyridinium, and the alignment film most preferably contains at least one compound selected from the group consisting of soluble polyimide, polyamic acid, and polyamic acid ester.

<Soluble Polyimide>

As soluble polyimide used in the present invention, various known soluble polyimides can be used. Examples thereof include polyimide described in page 105 of "Plastic LCD's Material Technology and Low Temperature Process, published by Technology Information Institute Co., Ltd".

<Polyamic Acid and Polyamic Acid Ester>

As a polyamic acid and a polyamic acid ester used in the present invention, various known polyamic acids and polyamic acid esters can be used. Examples thereof include polyamic acids and polyamic acid esters disclosed in JP2014-238564A.

<Methacrylic Acid Copolymer>

As a methacrylic acid copolymer used in the present invention, various known methacrylic acid copolymers can be used. Examples thereof include methacrylic acid copolymers disclosed in JP2002-98828A, JP2002-294240A, and the like. Particularly preferable examples thereof include a methacrylic acid copolymer containing a carbazole group.

<Alkyl Group-Containing Alkoxysilane>

As alkyl group-containing alkoxysilane used in the present invention, various known alkyl group-containing alkoxysilanes can be used. Examples thereof include alkyl group-containing alkoxysilanes disclosed in JP1984-60423A (JP-559-60423A), JP1987-269119A (JP-562-269119A), JP1987-269934A (JP-562-269934A), JP1987-270919A (JP-S62-270919A), WO2012/165354A, and the like. Particularly preferable examples thereof include alkoxysilanes containing a long chain alkyl group having 8 to 18 carbon atoms or an alkyl group substituted with a fluorine atom.

<Alkyl Group-Containing Ammonium>

As alkyl group-containing ammonium used in the present invention, various known alkyl group-containing ammoniums can be used. Examples thereof include alkyl group-containing ammoniums disclosed in JP2005-196015A and the like. Particularly preferable examples thereof include ammoniums containing a long chain alkyl group having 8 to 18 carbon atoms or an alkyl group substituted with a fluorine atom.

<Pyridinium>

As pyridinium used in the present invention, various known pyridiniums can be used. Examples thereof include pyridiniums disclosed in JP2005-196015A, JP2005-272422A, and the like. Particularly preferable examples thereof include a pyridinium represented by General Formula (I) disclosed in JP2005-272422A.

<Other Components>

The alignment film composition used in the present invention may contain other components in accordance with the requirements.

Examples of such other components include polymers other than the above-described polymer, and the like. The other components can be used for enhancing solution properties and electrical properties.

Examples of the other polymers include polyester, polyamide, cellulose derivative, polyacetal, polystyrene derivative, poly(styrene-phenylmaleimide) derivative, poly(meth)acrylate, and the like. In a case where the other polymer is contained in the alignment film composition, as a combination ratio, 20 parts by mass or less is preferable and 10 parts by mass is particularly preferable with respect to the total 100 parts by mass of the polymer components in the alignment film composition.

<Solvent>

The alignment film composition used in the present invention is preferably prepared as a liquid-like composition obtained by dispersing or dissolving, in an appropriate solvent, the above-described polymer, or the other components used as necessary.

Preferred examples of an organic solvent to be used include N-methyl-2-pyrrolidone, γ-butyrolactone, γ-butyrolactam, N,N-dimethylformamide, N,N-dimethylacetamide, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol-n-propyl ether, ethylene glycol-i-propyl ether, ethylene glycol-n-butyl ether (butyl cellosolve), ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, diisobutyl ketone, isoamyl propionate, isoamyl isobutyrate, diisopentyl ether, ethylene carbonate, propylene carbonate, and the like. These may be used alone or in combination of two or more kinds thereof.

A concentration of solid contents in the alignment film composition used in the present invention (ratio of the total mass of components other than the solvent of the alignment film composition to the total mass of the alignment film composition) is appropriately selected in consideration of viscosity, volatility, and the like, and is preferably 1% to 10% by mass. That is, the alignment film composition used in the present invention is applied to a surface of a plastic substrate to be described below and heated at 40° C. to 150° C., and therefore a coated film which is an alignment film or a coated film which becomes an alignment film is formed. In this case, in a case where a concentration of solid contents is less than 1% by mass, a film thickness of the coated film becomes excessively thin, and thus a favorable alignment film is unlikely to be obtained. On the other hand, in a case where a concentration of solid contents exceeds 10% by mass, a film thickness of the coated film becomes excessively thick, and thus a favorable alignment film is unlikely to be obtained, or viscosity of the alignment film increases, and thus application properties tend to deteriorate.

A particularly preferable range of a concentration of solid contents varies according to a purpose of use of the alignment film composition, and a method used in a case of applying the alignment film composition to the plastic substrate. For example, in a case of a printing method, it is particularly preferable that a concentration of solid contents is 3% to 9% by mass, by which solution viscosity becomes 12 to 50 mPa·s. In a case of an ink jet method, it is particularly preferable that a concentration of solid contents is 1 to 5% by mass, by which solution viscosity becomes 3 to 15 mPa·s. A temperature in a case where the alignment film composition used in the present invention is dried, is preferably 60° C. to 140° C. and particularly preferably 80° C. to 130° C.

[Migration Inhibitor]

In a case where any conductive layer used in the present invention is formed of metal nanowire and/or metal mesh, the migration inhibitor is preferably contained in the conductive layer and/or the polymer layer which is directly in contact with the conductive layer.

As the migration inhibitor, known migration inhibitors can be suitability used, and examples thereof include compounds disclosed in JP2009-188360A, JP2012-231035A, JP2013-125797A, and JP2014-133857A.

<Three-Dimensional Liquid Crystal Cell>

The three-dimensional liquid crystal cell of the present invention is formed by dimensionally changing the liquid crystal cell of the present invention at a rate of ±5% to 75%.

A dimensional change means a rate accounting for a difference before and after change when the dimension before change is 100. For example, 30% dimensional change means a state in which the dimension after change is 130 and a difference before and after change is 30 when the dimension before change is 100.

In addition, the three-dimensional liquid crystal cell of the present invention can be produced by three-dimensionally forming the liquid crystal cell of the present invention.

The three-dimensional formation means that, for example, the three-dimensional liquid crystal cell is formed by shrinkage after the liquid crystal cell of the present invention is formed into a tubular shape. For example, by shrinking and forming so as to follow a body shaped like a beverage bottle, a display device or a dimming device can be installed on the bottle, or a display device covering the vicinity of the cylindrical structure can be realized.

Alternatively, the three-dimensional liquid crystal cell can be formed by pressing the liquid crystal cell into a shape of a mold under an environment near a Tg of the plastic substrate.

EXAMPLES

Hereinafter, the invention will be described in detail with reference to examples. The materials, the reagents, the amounts of materials, the proportions thereof, the conditions, the operations, and the like which will be shown in the following examples can be appropriately modified within a range not departing from the gist of the invention. Accordingly, the scope of the invention is not limited to the following examples.

«Light Transmittance»

Light transmittance in the present invention is an average value of values of ten times measurements at a wavelength of 400 to 750 nm by using spectrophotometer (UV 3150 manufactured by Shimadzu Corporation).

«Sheet Resistance Value»

A sheet resistance value in the present invention is a value measured under an environment of 25° C. and relative humidity of 55% by using a resistivity meter (LORESTA GP MCP-T600 manufactured by Mitsubishi Chemical Corporation) and ESP probe (MCP-TP08P).

In a case where a sheet resistance cannot be directly measured by the above method because of a reason that another layer (insulating layer and the like) is laminated to a measurement target, or the like, the sheet resistance is a value obtained by using a non-contact sheet resistance meter such as an eddy current type resistance meter which is calibrated by the above measurement method.

«Haze»

Haze in the present invention is a value measured under the following conditions based on JIS K-7136 (2000).

[Device name] Haze meter NDH 2000 (Manufactured by NIPPON DENSHOKU INDUSTRIES Co., Ltd.)

[Sample size] 50 mm×50 mm

[Measure environment] 25° C. and relative humidity of 55%

«Adhesiveness Evaluation»

Adhesiveness in the present invention was visually observed by placing each film on a grid pattern of a cut square of 1 mm, adhering an adhesive tape (trade name: CELLOTAPE (registered trademark) manufactured by NICHIBAN CO., LTD.) to the surface of the polymer layer, and then peeling off the adhesive tape. At this time, the adhesiveness was evaluated based on the number of squares in the portion from which the tape was not peeled off/the number of squares in the area to which the tape was adhered.

A: 0 to 15 squares were peeled off.
B: 15 to 50 squares were peeled off.
C: 50 to 100 squares were peeled off.

«Insulation Reliability Evaluation Method»

In regard to reliability evaluation in the present invention, before processing a three-dimensional liquid crystal cell to be described below, lifetime measurement (device used: EHS-221MD manufactured by ESPEC CORP.) was performed under forced conditions of a humidity of 85%, a temperature of 85° C., a pressure of 1.0 atm, and a voltage of 30 V by using a plastic substrate to which only a conductive layer and a polymer layer are laminated.

In the evaluation method, lifetime measurement was performed under the above conditions by using the substrate, and a time T1 until a resistance value of the conductive layer reached $1 \times 10^5 \Omega$ was measured.

Next, metal nanowire was used in the conductive layer, lifetime measurement was performed using the substrate of a case not containing a migration inhibitor by the same method, and a time T2 until a resistance value reached $1 \times 10^5 \Omega$ was measured.

By using the obtained time T1 and time T2, the improvement effect of the lifetime (T1/T2) was calculated so as to carry out evaluation according to the following standard. D can be used in practice, but B or higher value is preferable.

A: $T1/T2 \geq 5$
B: $5 > T1/T2 \geq 2$
C: $2 > T1/T2 > 1$
D: $1 \geq T1/T2$

Example 1

<Plastic Substrate Production>

Polycarbonate (PC-2151, thickness of 250 μm) manufactured by TEIJIN LIMITED. was pinched by a clip and stretched at a ratio of 20% in a film transport direction (Machine Direction: MD) and at a ratio of 100% in a direction perpendicular to the MD (Transverse Direction: TD) by using a tenter under conditions of a stretching temperature of 155° C. and of fixed end biaxial stretching, and therefore the plastic substrate was produced. At this time, the glass transition temperature (Tg) was 150° C., and the heat shrinkage rate in the TD measured by the above-described method was 40%.

The in-plane direction in which a heat shrinkage rate is maximum was substantially coincident with the TD, and a heat shrinkage rate in the MD perpendicular thereto was 6%.

<Production of Conductive Layer>

On a surface of the plastic substrate produced as described above, a conductive layer was produced by using Ag nanowire according to the method disclosed in Example 1 of US Patent App. No. 2013/0341074, and a laminate on which the plastic substrate formed of the stretched polycarbonate and the conductive layer formed of the Ag nanowire were laminated was produced. A film thickness of the conductive layer was 15 μm.

The laminate produced as above was cut to a square of 10 cm, and then light transmittance, a sheet resistance value, and haze were measured. As a result, the light transmittance was 90%, the sheet resistance value was 40Ω/□, and the haze was 0.65.

<Production of Polymer Layer>

A polymer layer-coating solution was produced using the following formulation.

Formulation of polymer layer-coating solution

| | |
|---|---|
| BLEMMER GLM (manufactured by NOF CORPORATION) | 80 parts by mass |
| PET30 (manufactured by Nippon Kayaku Co., Ltd.) | 20 parts by mass |

-continued

| Photopolymerization initiator (IRGACURE 819 (manufactured by BASF SE)) | 3 parts by mass |
| --- | --- |
| Surfactant A | 0.5 parts by mass |
| Ethanol | 200 parts by mass |

BLEMMER GLM

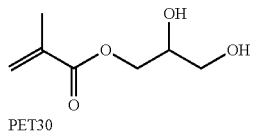

PET30

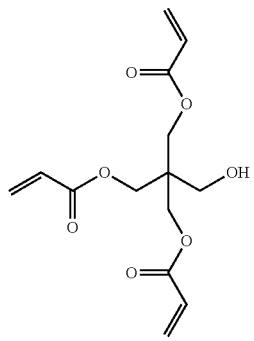 [SMILES: C=CC(=O)OCC(CO)(COC(=O)C=C)COC(=O)C=C]

Surfactant A

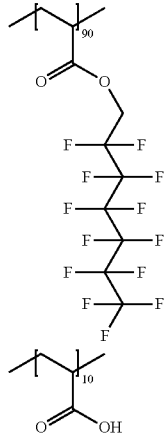

By using Bar Coater #3, the produced polymer layer-coating solution was applied on the conductive layer in an application amount by which a film thickness becomes 1.3 μm, heated so that a film surface temperature became 50° C., and then dried for 1 minute. Thereafter, under a nitrogen purge with an oxygen concentration of 100 ppm or less, irradiation of 500 mJ/cm² of ultraviolet rays was carried out using an ultraviolet irradiation device so as to proceed the polymerization reaction, and therefore a polymer layer was produced. An illuminance irradiation dose was measured at a wavelength of 365 nm. Mercury was used as a lamp.

The adhesiveness was evaluated using the plastic substrate to which the produced polymer layer-coating solution was applied, the evaluation was A and the adhesiveness was excellent.

In addition, the silver nanowire was used in the conductive layer of Example 1, lifetime measurement was performed on the substrate of a case of not containing the migration inhibitor by the reliability evaluation method described above, and a time until a resistance value reached $1 \times 10^5 \Omega$ was T2.

A wavelength of maximum absorbance of BLEMMER GLM (manufactured by NOF CORPORATION) was 210 nm and a SP value thereof was 26. In addition, a film thickness of the polymer layer was 1.5 μm.

A wavelength of maximum absorbance of PET30 (manufactured by Nippon Kayaku Co., Ltd.) was 215 nm.

<Production of Alignment Film>

By using Bar Coater #1.6, a polyamic acid alignment film coating solution (JALS 684, manufactured by JSR Corporation) as a liquid crystal alignment agent was applied on the polymer layer produced as above. Thereafter, drying was performed for 3 minutes at a point where a film surface temperature reached 80° C., and therefore a liquid crystal alignment film 101 was produced. At this time, the film thickness of the liquid crystal alignment film was 60 nm.

Two sets of laminates in which the heat-shrinkable film (plastic substrate), the conductive layer, the polymer layer, and the liquid crystal alignment film, which were produced as above, were laminated in this order, were prepared.

<Production of Spacer Layer>

A spacer layer dispersion liquid was produced using the following formulation.

Formulation of spacer layer dispersion liquid

| Bead spacer SP-208 (manufactured by SEKISUI CHEMICAL CO., LTD.) | 100 parts by mass |
| --- | --- |
| Methyl isobutyl ketone | An amount such that a solid content is 0.2% by mass |

The produced spacer layer dispersion liquid was applied to the alignment film by using an applicator under a setting of a clearance of 100 μm. Thereafter, heating was performed so that a film surface temperature became 60° C., drying was performed for 1 minute, and therefore a spacer layer was produced.

<Production of Liquid Crystal Cell>

A liquid crystal layer composition was produced using the following formulation.

Formulation of spacer layer dispersion liquid
Liquid crystal layer composition

| ZLI2806 (manufactured by Merck Ltd.) | 100 parts by mass |
| --- | --- |
| Cholesterol Nonanoate (manufactured by Tokyo Chemical Industry Co., Ltd.) | 1.74 parts by mass |
| G-472 (manufactured by Hayashibara Co., Ltd.) | 3.00 parts by mass |

An ultraviolet (UV) sealing agent TB3026 (manufactured by ThreeBond Holdings Co., Ltd.) was arranged at the end of the alignment film on which the spacer layer was arranged in accordance with the shape of the laminate produced above, the produced liquid crystal layer composition was added dropwise to the center of the alignment film, a laminate in which formation was performed up to the alignment film by the same method was inserted, the liquid crystal layer composition was uniformly spread with a roller, and therefore a liquid crystal cell was produced. In the produced liquid crystal cell, the liquid crystals were uniformly aligned vertically and showed a light blue color. In addition, an average light transmittance at 400 to 750 nm was 75%.

<Production of Three-Dimensional Liquid Crystal Cell>

The produced liquid crystal cell was fixed to a mold prepared separately and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, no whitening or cracking occurred, and an average light transmittance at 400 to 750 nm was maintained at 75%.

<Confirmation of Drive>

The conductive layer of the produced three-dimensional liquid crystal cell was connected to an electrode and a voltage of 3 V was applied thereto, and it was confirmed that the three-dimensional liquid crystal cell can drive by being reversibly colored and decolorized according to application and non-application.

Example 2

<Production of Liquid Crystal Cell>

A liquid crystal cell was produced in the same manner as in Example 1 except that BLEMMER AE400 (manufactured by NOF CORPORATION) described below was used instead of BLEMMER GLM (manufactured by NOF CORPORATION) of the polymer layer. A wavelength of maximum absorbance of BLEMMER AE400 was 210 nm, and a SP value thereof was 25. In addition, a film thickness of the polymer layer was 1.5 μm.

The evaluation on adhesiveness of the plastic substrate to which the produced polymer layer was applied was A, and the adhesiveness was excellent.

In addition, the silver nanowire was used in the conductive layer of Example 2, and a result of lifetime measurement performed on the substrate of a case of not containing the migration inhibitor was the same as Example 1, and a time until a resistance value reached $1 \times 10^5 \Omega$ was T2.

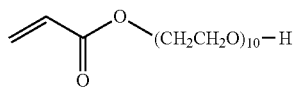

BLEMMER AE400

<Production of Three-Dimensional Liquid Crystal Cell>

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, no whitening or cracking occurred, and an average light transmittance at 400 to 750 nm was maintained at 75%.

<Confirmation of Drive>

The conductive layer of the produced three-dimensional liquid crystal cell was connected to an electrode and a voltage of 3 V was applied thereto, and it was confirmed that the three-dimensional liquid crystal cell can drive by being reversibly colored and decolorized according to application and non-application.

Example 3

<Production of Liquid Crystal Cell>

A liquid crystal cell was produced in the same manner as in Example 1 except that acrylamide was used instead of BLEMMER GLM (manufactured by NOF CORPORATION) of the polymer layer. A maximum absorbance of the acrylamide film was 203 nm, and a SP value thereof was 27. In addition, a film thickness of the polymer layer was 1.5 μm.

The evaluation on adhesiveness of the plastic substrate to which the produced polymer layer was applied was A, and the adhesiveness was excellent.

In addition, the silver nanowire was used in the conductive layer of Example 3, and a result of lifetime measurement performed on the substrate of a case of not containing the migration inhibitor was the same as Example 1, and a time until a resistance value reached $1 \times 10^5 \Omega$ was T2.

<Production of Three-Dimensional Liquid Crystal Cell>

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, no whitening or cracking occurred, and an average light transmittance at 400 to 750 nm was maintained at 75%.

<Confirmation of Drive>

The conductive layer of the produced three-dimensional liquid crystal cell was connected to an electrode and a voltage of 3 V was applied thereto, and it was confirmed that the three-dimensional liquid crystal cell can drive by being reversibly colored and decolorized according to application and non-application.

Example 4

<Production of Liquid Crystal Cell>

A liquid crystal cell was produced in the same manner as in Example 1 except that BLEMMER PME4000 (manufactured by NOF CORPORATION) described below was used instead of BLEMMER GLM (manufactured by NOF CORPORATION) of the polymer layer. A maximum absorbance of the BLEMMER PME4000 film was 210 nm, and a SP value thereof was 21. In addition, a film thickness of the polymer layer was 1.5 μm.

The evaluation on adhesiveness of the plastic substrate to which the produced polymer layer was applied was A, and the adhesiveness was excellent.

In addition, the silver nanowire was used in the conductive layer of Example 4, and a result of lifetime measurement performed on the substrate of a case of not containing the migration inhibitor was the same as Example 1, and a time until a resistance value reached $1 \times 10^5 \Omega$ was T2.

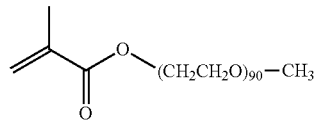

BLEMMER PME400

<Production of Three-Dimensional Liquid Crystal Cell>

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold. Whitening or cracking was slighted observed, and it was found that vertical alignment of the liquid crystal was disturbed, and therefore, an average light transmittance at 400 to 750 nm was lowered to 60%.

<Confirmation of Drive>

The conductive layer of the produced three-dimensional liquid crystal cell was connected to an electrode and a voltage of 3 V was applied thereto, and it was confirmed that the three-dimensional liquid crystal cell can drive by being reversibly colored and decolorized according to application and non-application.

Example 5

<Production of Liquid Crystal Cell>

A liquid crystal cell was produced in the same manner as in Example 1 except that DPHA (manufactured by Nippon Kayaku Co., Ltd.) described below was used instead of PET30 (manufactured by Nippon Kayaku Co., Ltd.) of the polymer layer. A maximum absorbance of the DPHA film was 213 nm.

The evaluation on adhesiveness of the plastic substrate to which the produced polymer layer was applied was A, and the adhesiveness was excellent.

In addition, the silver nanowire was used in the conductive layer of Example 5, and a result of lifetime measurement performed on the substrate of a case of not containing the migration inhibitor was the same as Example 1, and a time until a resistance value reached $1 \times 10^5 \Omega$ was T2.

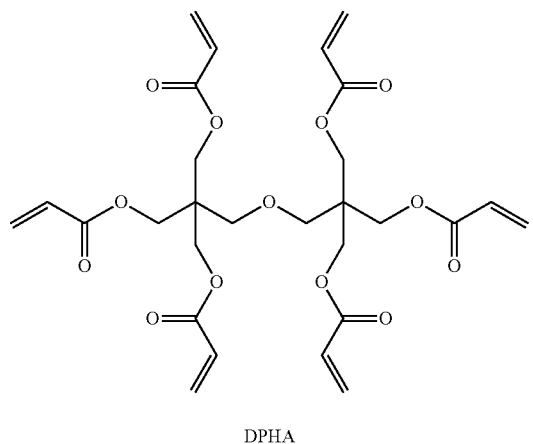

DPHA

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, no whitening or cracking occurred, and an average light transmittance at 400 to 750 nm was maintained at 75%.

<Confirmation of Drive>

The conductive layer of the produced three-dimensional liquid crystal cell was connected to an electrode and a voltage of 3 V was applied thereto, and it was confirmed that the three-dimensional liquid crystal cell can drive by being reversibly colored and decolorized according to application and non-application.

Example 6

<Production of Liquid Crystal Cell>

A liquid crystal cell was produced in the same manner as in Example 1 except that EA-5321 (manufactured by SHIN-NAKAMURA CHEMICAL CO., LTD.) described below was used instead of PET30 (manufactured by Nippon Kayaku Co., Ltd.) of the polymer layer. A maximum absorbance of the EA-5321 film was 208 nm.

The evaluation on adhesiveness of the plastic substrate to which the produced polymer layer was applied was A, and the adhesiveness was excellent.

In addition, the silver nanowire was used in the conductive layer of Example 6, and a result of lifetime measurement performed on the substrate of a case of not containing the migration inhibitor was the same as Example 1, and a time until a resistance value reached $1 \times 10^5 \Omega$ was T2.

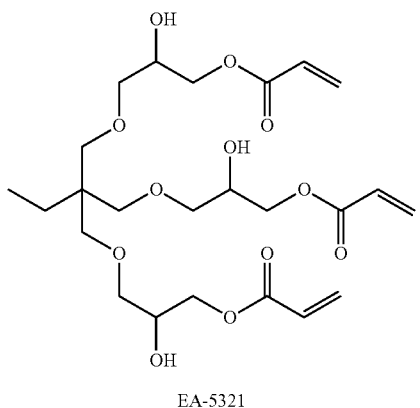 [SMILES: C=CC(=O)OCC(O)COCC(CC)(COCC(O)COC(=O)C=C)COCC(O)COC(=O)C=C]

EA-5321

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, no whitening or cracking occurred, and an average light transmittance at 400 to 750 nm was maintained at 75%.

<Confirmation of Drive>

The conductive layer of the produced three-dimensional liquid crystal cell was connected to an electrode and a voltage of 3 V was applied thereto, and it was confirmed that the three-dimensional liquid crystal cell can drive by being reversibly colored and decolorized according to application and non-application.

Example 7

<Production of Liquid Crystal Cell>

A liquid crystal cell was produced in the same manner as in Example 1 except that DL-2-Allylglycene (manufactured by Tokyo Chemical Industry Co., Ltd.) described below was used instead of BLEMMER GLM (manufactured by NOF CORPORATION) of the polymer layer. A wavelength of maximum absorbance of DL-2-Allylglycene was 210 nm, and a SP value thereof was 27. In addition, a film thickness of the polymer layer was 1.5 µm.

The evaluation on adhesiveness of the plastic substrate to which the produced polymer layer was applied was A, and the adhesiveness was excellent.

In addition, the silver nanowire was used in the conductive layer of Example 7, and a result of lifetime measurement performed on the substrate of a case of not containing the migration inhibitor was the same as Example 1, and a time until a resistance value reached $1 \times 10^5 \Omega$ was T2.

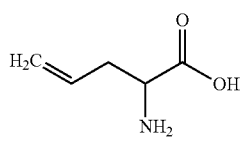

DL-2-Allylglycene

<Production of Three-Dimensional Liquid Crystal Cell>

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, no whitening or cracking occurred, and an average light transmittance at 400 to 750 nm was maintained at 75%.

<Confirmation of Drive>

The conductive layer of the produced three-dimensional liquid crystal cell was connected to an electrode and a voltage of 3 V was applied thereto, and it was confirmed that the three-dimensional liquid crystal cell can drive by being reversibly colored and decolorized according to application and non-application.

Example 8

<Production of Liquid Crystal Cell>

A liquid crystal cell of Example 8 in which a carbon nanobud was used as a conductive layer was produced in the same manner as in Example 1 except that instead of the Ag nanowire, a carbon nanobud was formed on a surface of a stretched PET film by a direct dry-printing (DDP) method described in SID 2015 DIGEST, page 1012. A film thickness of the conductive layer was 100 nm. In the produced cell, the liquid crystals were uniformly aligned vertically and showed a light blue color. In addition, an average light transmittance at 400 to 750 nm was 70%.

In addition, the produced plastic substrate having the carbon nanobud was cut to a square of 10 cm, and then light transmittance, a sheet resistance value, and haze were measured. As a result, the light transmittance was 82%, the sheet resistance value was 110 Ω/□, and the haze was 0.80.

The evaluation on adhesiveness of the plastic substrate to which the carbon nanobud and the polymer layer of Example 8 were applied was A, and the adhesiveness was excellent.

Particularly, as a result of lifetime measurement performed on the substrate of a case in which the carbon nanobud was used in the conductive layer of Example 8, the evaluation was A and the reliability was also excellent.

<Production of Three-Dimensional Liquid Crystal Cell>

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, no whitening or cracking occurred, and an average light transmittance at 400 to 750 nm was maintained at 70%.

<Confirmation of Drive>

The conductive layer of the produced three-dimensional liquid crystal cell was connected to an electrode and a voltage of 3 V was applied thereto, and it was confirmed that the three-dimensional liquid crystal cell can drive by being reversibly colored and decolorized according to application and non-application.

Example 9

<Production of Liquid Crystal Cell>

A liquid crystal cell was produced in the same manner as in Example 1 except that the formulation of the polymer layer-coating solution was altered as follows. The evaluation on adhesiveness of the plastic substrate to which the produced polymer layer was applied was A, and the adhesiveness was excellent.

In addition, the metal nanowire was used in the conductive layer of Example 9, but the migration inhibitor was used in the polymer layer, and therefore as a result of lifetime measurement performed on the substrate, the evaluation was B and the reliability was also excellent.

Formulation of polymer layer-coating solution

| | |
|---|---|
| BLEMMER GLM (manufactured by NOF CORPORATION) | 80 parts by mass |
| PET30 (manufactured by Nippon Kayaku Co., Ltd.) | 20 parts by mass |
| Photopolymerization initiator (IRGACURE 819 (manufactured by BASF SE)) | 3 parts by mass |
| Migration inhibitor A | 5 parts by mass |
| Surfactant A | 0.5 parts by mass |
| Ethanol | 200 parts by mass |

Migration inhibitor A

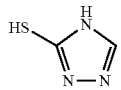

<Production of Three-Dimensional Liquid Crystal Cell>

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, no whitening or cracking occurred, and an average light transmittance at 400 to 750 nm was maintained at 70%.

<Confirmation of Drive>

The conductive layer of the produced three-dimensional liquid crystal cell was connected to an electrode and a voltage of 3 V was applied thereto, and it was confirmed that the three-dimensional liquid crystal cell can drive by being reversibly colored and decolorized according to application and non-application.

Example 10

<Production of Liquid Crystal Cell>

A liquid crystal cell was produced in the same manner as in Example 9 except that a migration inhibitor B described below was used instead of the migration inhibitor A of the polymer layer.

The evaluation on adhesiveness of the plastic substrate to which the produced polymer layer was applied was A, and the adhesiveness was excellent.

In addition, the metal nanowire was also used in the conductive layer of Example 10, but the migration inhibitor was used in the polymer layer, and therefore as a result of lifetime measurement performed on the substrate, the evaluation was A and the reliability was also excellent.

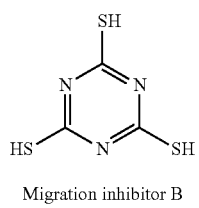

Migration inhibitor B

<Production of Three-Dimensional Liquid Crystal Cell>

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, no whitening or cracking occurred, and an average light transmittance at 400 to 750 nm was maintained at 70%.

Example 11

<Production of Polymer Layer 1>

By using Bar Coater #3, the polymer layer-coating solution produced in Example 1 was applied on a surface of the stretched plastic substrate produced in Example 1 in an application amount by which a film thickness becomes 0.7 μm, heated so that a film surface temperature became 50° C., and then dried for 1 minute. Thereafter, under a nitrogen purge with an oxygen concentration of 100 ppm or less, irradiation of 500 mJ/cm$^2$ of ultraviolet rays was carried out using an ultraviolet irradiation device so as to proceed the polymerization reaction, and therefore Polymer layer 1 was produced. An illuminance irradiation dose was measured at a wavelength of 365 nm. Mercury was used as a lamp.

<Production of Conductive Layer>

On a surface of Polymer layer 1 produced as described above, a conductive layer was produced by using Ag nanowire according to the method disclosed in Example 1 of US Patent App. No. 2013/0341074, and a laminate on which the plastic substrate formed of the stretched polycarbonate and Polymer layer 1, and the conductive layer formed of the Ag nanowire were laminated was produced. A thickness of the coating film of the conductive layer was 15 μm.

The laminate produced as above was cut to a square of 10 cm, and then light transmittance, a sheet resistance value, and haze were measured. As a result, the light transmittance was 90%, the sheet resistance value was 40 Ω/□, and the haze was 0.65.

<Production of Polymer Layer 2>

By using Bar Coater #3, the polymer layer-coating solution produced in Example 10 was applied on the conductive layer in an application amount by which a film thickness becomes 1.3 μm, heated so that a film surface temperature became 50° C., and then dried for 1 minute. Thereafter, under a nitrogen purge with an oxygen concentration of 100 ppm or less, irradiation of 500 mJ/cm$^2$ of ultraviolet rays was carried out using an ultraviolet irradiation device so as to proceed the polymerization reaction, and therefore a Polymer Layer 2 was produced. An illuminance irradiation dose was measured at a wavelength of 365 nm. Mercury was used as a lamp.

The evaluation on adhesiveness of the plastic substrate to which the produced polymer layer was applied was performed and the evaluation was A, and the adhesiveness was excellent.

In addition, the metal nanowire was also used in the conductive layer of Example 11, but the migration inhibitor was used in Polymer Layer 2, and therefore as a result of lifetime measurement performed on the substrate, the evaluation was A and the reliability was also excellent.

<Production of Alignment Film>

By using Bar Coater #1.6, a polyamic acid alignment film coating solution (JALS 684, manufactured by JSR Corporation) as a liquid crystal alignment agent was applied on Polymer Layer 2 produced as above. Thereafter, drying was performed for 3 minutes at a point where a film surface temperature reached 80° C., and therefore a liquid crystal alignment film was produced. At this time, a film thickness of the liquid crystal alignment film was 60 nm.

Two sets of laminates in which the heat-shrinkable film (plastic substrate), Polymer Layer 1, the conductive layer, Polymer Layer 2 (having the migration inhibitor therein), and the liquid crystal alignment film, which were produced as above, were laminated in this order, were prepared.

<Production of Spacer Layer>

The spacer layer dispersion liquid produced in Example 1 was applied to the alignment film by using an applicator under a setting of a clearance of 100 μm. Thereafter, heating was performed so that a film surface temperature became 60° C., drying was performed for 1 minute, and therefore a spacer layer was produced.

<Production of Liquid Crystal Cell>

An ultraviolet (UV) sealing agent TB3026 (manufactured by ThreeBond Holdings Co., Ltd.) was arranged at the end of the alignment film on which the spacer layer was arranged in accordance with the shape of the laminate produced above, the produced liquid crystal layer composition was added dropwise to the center of the alignment film, an alignment film produced by the same method was inserted, the liquid crystal layer composition was uniformly spread with a roller, and therefore a liquid crystal cell was produced. In the produced liquid crystal cell, the liquid crystals were uniformly aligned vertically and showed a light blue color. In addition, an average light transmittance at 400 to 750 nm was 70%.

<Production of Three-Dimensional Liquid Crystal Cell>

The produced liquid crystal cell was fixed to a mold prepared separately and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, no whitening or cracking occurred, and an average light transmittance at 400 to 750 nm was almost maintained at 69%.

<Confirmation of Drive>

The conductive layer of the produced three-dimensional liquid crystal cell was connected to an electrode and a voltage of 3 V was applied thereto, and it was confirmed that the three-dimensional liquid crystal cell can drive by being reversibly colored and decolorized according to application and non-application.

Comparative Example 1

<Production of Liquid Crystal Cell>

A liquid crystal cell was produced in the same manner as in Example 1 except that the polymer layer was not disposed.

<Production of Three-Dimensional Liquid Crystal Cell>

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, but the support was impregnated with the liquid crystal compound, and thus severe whitening occurred. In addition, the liquid crystals were not uniformly aligned vertically. Accordingly, an average light transmittance at 400 to 750 nm was lowered to 20%.

Comparative Example 2

A liquid crystal cell was produced in the same manner as in Example 1 except that DPHA (manufactured by Nippon Kayaku Co., Ltd., a mixture of dipentaerythritol pentaacrylate and dipentaerythritol hexaacrylate) was used instead of BLEMMER GLM (manufactured by NOF CORPORATION) of the polymer layer.

A maximum absorbance of the DPHA film was 210 nm, and a SP value thereof was 21.

In addition, a film thickness of the polymer layer was 1.5 µm.

<Production of Three-Dimensional Liquid Crystal Cell>

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, but cracking occurred in addition to sever whitening. In addition, the liquid crystals were not uniformly aligned vertically. Accordingly, an average light transmittance at 400 to 750 nm cannot be measured.

Comparative Example 3

<Production of Liquid Crystal Cell>

A liquid crystal cell was produced in the same manner as in Example 1 except that SP327 (manufactured by OSAKA ORGANIC CHEMICAL INDUSTRY LTD.) described below was used instead of BLEMMER GLM (manufactured by NOF CORPORATION) of the polymer layer.

A maximum absorbance of the SP327 film was 210 nm, and a SP value thereof was 20.

In addition, a film thickness of the polymer layer was 1.5 µm.

SP327

$l + m + n = 3$

<Production of Three-Dimensional Liquid Crystal Cell>

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold, and the polymer layer was formed by polymerization of acrylate having a nonionic hydrophilic group (polyethylene oxy group), but the acrylate is trifunctional acrylate, and therefore sever cracking occurred in addition to whitening. In addition, the liquid crystals were not uniformly aligned vertically. Accordingly, an average light transmittance at 400 to 750 nm cannot be measured.

Comparative Example 4

<Production of Liquid Crystal Cell>

A liquid crystal cell was produced in the same manner as in Example 1 except that lauryl acrylate (manufactured by OSAKA ORGANIC CHEMICAL INDUSTRY LTD.) described below was used instead of BLEMMER GLM (manufactured by NOF CORPORATION) of the polymer layer.

A maximum absorbance of the lauryl acrylate film was 210 nm, and a SP value thereof was 18.

In addition, a film thickness of the polymer layer was 1.5 µm.

Lauryl acrylate

<Production of Three-Dimensional Liquid Crystal Cell>

The produced liquid crystal cell was fixed to the mold used in Example 1 and heated at 155° C. for 30 minutes, followed by shrinkage molding, and therefore a three-dimensional liquid crystal cell was produced. A dimensional change at this time was −10%. The produced three-dimensional liquid crystal cell had a shape conforming to the mold. The polymer layer was formed by polymerization of monofunctional acrylate, and therefore cracking did not occur, but because the acrylate has no hydrophilic group and is hydrophobic, the barrier performance of the liquid crystal is insufficient, and therefore whitening occurred. In addition, the liquid crystals were not uniformly aligned vertically. Accordingly, an average light transmittance at 400 to 750 nm cannot be measured.

EXPLANATION OF REFERENCES 1, 4: plastic substrate
2, 8: polymer layer
3: liquid crystal layer
5, 9: conductive layer
6, 7: alignment film
10: liquid crystal cell

What is claimed is:
1. A liquid crystal cell, comprising:
   at least two plastic substrates of which at least one plastic substrate is a heat-shrinkable film satisfying a heat shrinkage rate of 5% to 75%;
   a liquid crystal layer; and
   a polymer layer that is disposed between and separates at least one plastic substrate and the liquid crystal layer and into which a composition containing at least one monofunctional monomer that has a hydrophilic group and is selected from the group consisting of monofunc- tional acrylate and monofunctional methacrylate, and at least one polyfunctional monomer that has two or more functional groups and is selected from the group consisting of polyfunctional acrylate and polyfunctional methacrylate, is polymerized, wherein a wavelength of maximum absorbance of each of the at least one monofunctional monomer and the at least one polyfunctional monomer is 190 to 250 nm.

2. The liquid crystal cell according to claim 1,
wherein the composition containing the at least one monofunctional monomer and the at least one polyfunctional monomer exhibits any one or both of thermosetting properties and ultraviolet curing properties.

3. The liquid crystal cell according to claim 1
wherein the at least one monofunctional monomer has two or more hydrophilic groups.

4. The liquid crystal cell according to claim 1,
wherein the hydrophilic group is a nonionic hydrophilic group.

5. The liquid crystal cell according to claim 4,
wherein the nonionic hydrophilic group is at least one hydrophilic group selected from the group consisting of a hydroxyl group, a substituted or unsubstituted amino group, and a polyethylene glycol group.

6. The liquid crystal cell according to claim 1,
wherein the at least one monofunctional monomer has two or more hydroxyl groups as the hydrophilic group.

7. The liquid crystal cell according to claim 1,
wherein the at least one monofunctional monomer has both a hydroxyl group and a substituted or unsubstituted amino group as the hydrophilic group.

8. The liquid crystal cell according to claim 1,
wherein a SP value of the at least one monofunctional monomer is 22 to 40.

9. The liquid crystal cell according to claim 2,
wherein a SP value of the at least one monofunctional monomer is 22 to 40.

10. The liquid crystal cell according to claim 3,
wherein a SP value of the at least one monofunctional monomer is 22 to 40.

11. The liquid crystal cell according to claim 4,
wherein a SP value of the at least one monofunctional monomer is 22 to 40.

12. The liquid crystal cell according to claim 5,
wherein a SP value of the at least one monofunctional monomer is 22 to 40.

13. The liquid crystal cell according to claim 6,
wherein a SP value of the at least one monofunctional monomer is 22 to 40.

14. The liquid crystal cell according to claim 1,
wherein all the plastic substrates are heat-shrinkable films satisfying a heat shrinkage rate of 5% to 75%.

15. The liquid crystal cell according to claim 1,
wherein at least one plastic substrate is a thermoplastic resin film stretched at a ratio that is greater than 0% and not greater than 300%.

16. The liquid crystal cell according to claim 1, further comprising:
a conductive layer that is disposed between the plastic substrate and the polymer layer.

17. The liquid crystal cell according to claim 16,
wherein the conductive layer is formed of at least one compound selected from the group consisting of metal nanowire, carbon nanotube, graphene, polymer conductor, and metal mesh.

18. The liquid crystal cell according to claim 16,
wherein any one or both of the conductive layer and the polymer layer have a migration inhibitor.

19. The liquid crystal cell according to claim 1, further comprising:
a conductive layer that is disposed between the polymer layer and the liquid crystal layer.

20. A liquid crystal cell, comprising:
at least two plastic substrates of which at least one plastic substrate is a heat-shrinkable film satisfying a heat shrinkage rate of 5% to 75%;
a liquid crystal layer; and
a polymer layer that is disposed between at least one plastic substrate and the liquid crystal layer and that prevents the liquid crystal from blending into the at least one plastic substrate and into which a composition containing at least one monofunctional monomer that has a hydrophilic group and is selected from the group consisting of monofunctional acrylate and monofunctional methacrylate, and at least one polyfunctional monomer that has two or more functional groups and is selected from the group consisting of polyfunctional acrylate and polyfunctional methacrylate, is polymerized,
wherein a wavelength of maximum absorbance of each of the at least one monofunctional monomer and the at least one polyfunctional monomer is 190 to 250 nm.

* * * * *